April 21, 1931.  C. C. FARMER  1,801,854
SLACK ADJUSTER
Filed Dec. 18, 1928   2 Sheets-Sheet 1
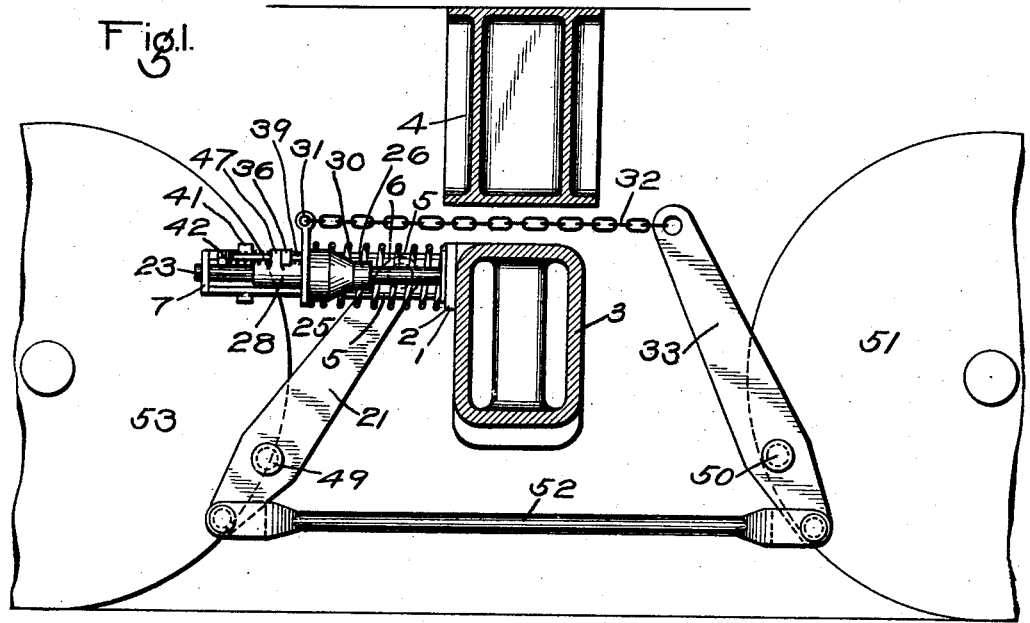
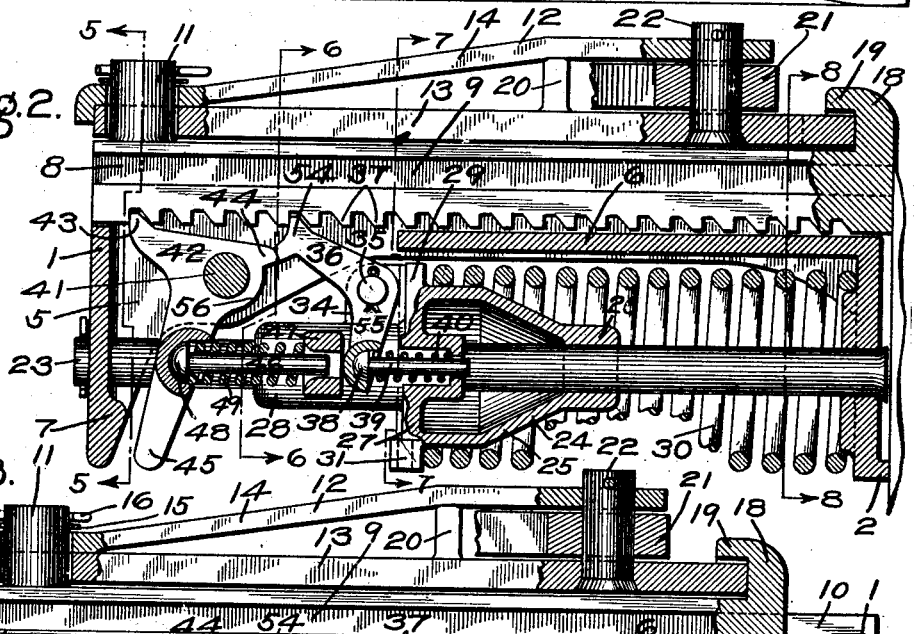
INVENTOR
CLYDE C. FARMER
BY
Wm. H. Cady
ATTORNEY April 21, 1931. C. C. FARMER 1,801,854
SLACK ADJUSTER
Filed Dec. 18, 1928 2 Sheets-Sheet 2
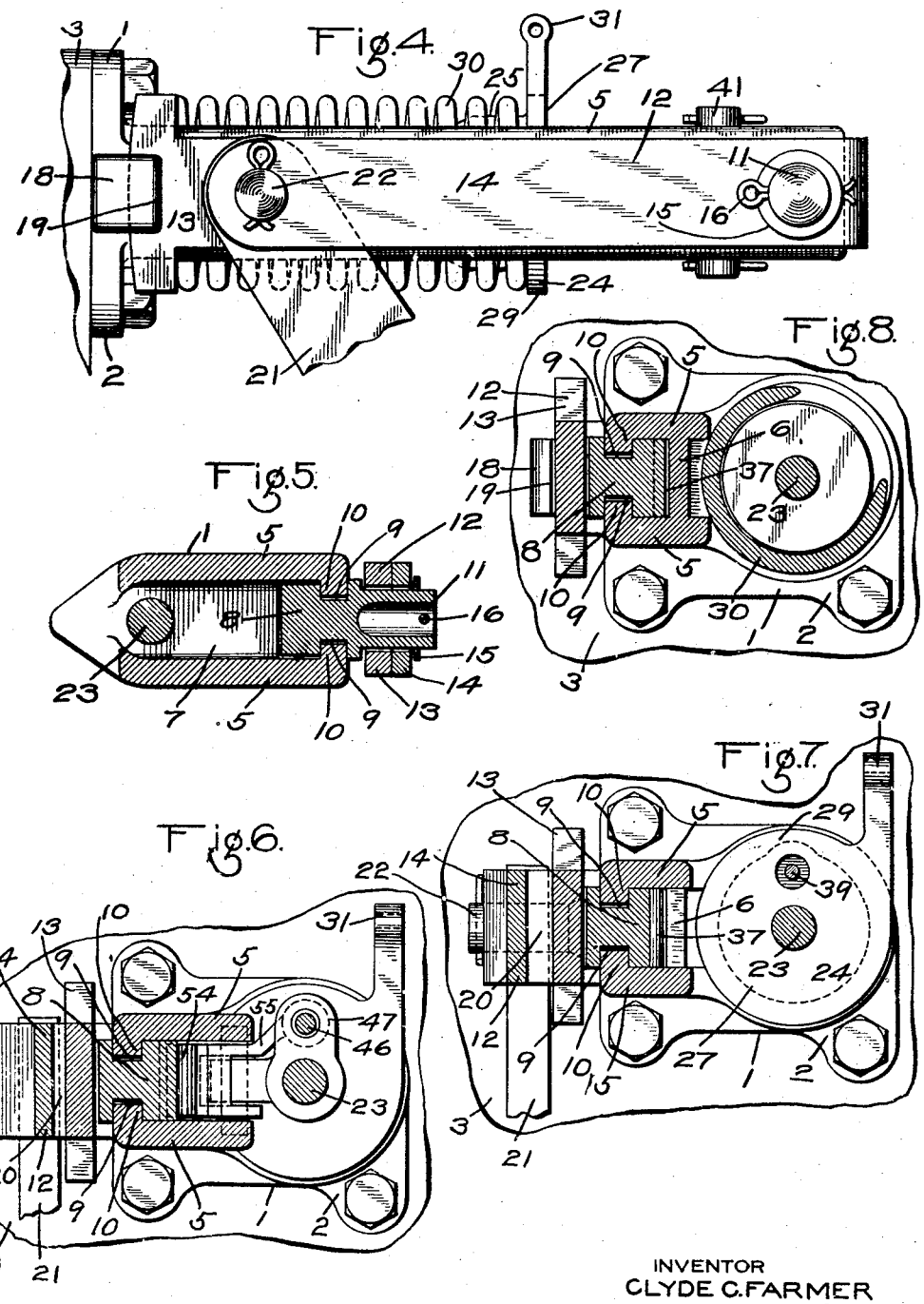
INVENTOR
CLYDE C. FARMER
BY Wm. M. Cady
ATTORNEY Patented Apr. 21, 1931

1,801,854

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

SLACK ADJUSTER

Application filed December 18, 1928. Serial No. 326,734.

This invention relates to brake equipment for railway cars, and more particularly to slack adjusters of the pawl and ratchet type.

The principal object of my invention is to provide an improved slack adjuster of the above type.

Another object of my invention is to provide a slack adjuster for railway car brakes which may be easily reset when new brake shoes are applied or for any other reason.

Another object of my invention is to provide a railway brake slack adjuster of the pawl and ratchet type embodying novel means for locking the adjusting and locking pawls out of operative engagement with an adjusting member of the adjuster, and for automatically unlocking the pawls.

A further object of my invention is to provide improved means for connecting a brake lever to an automatic slack adjuster mounted on a relatively movable part of a car, so that movement of the slack adjuster, with the movable part of the car, will not be transmitted to the brake lever.

A still further object of my invention is to provide a railway car brake slack adjuster having means whereby reactionary braking forces exerted by a dead brake lever, upon an anchor or fulcrum member which is pivotally connected to the adjuster and brake lever, are transmitted to the adjuster independently of the pivotal connection between the member and the adjuster.

Other objects and advantages will appear from the following more detailed description of the invention.

In the accompanying drawings; Fig. 1 is a side elevational view illustrating the manner in which my slack adjuster may be applied to a railway car truck, the truck bolster and body bolster being shown in section; Fig. 2 is an enlarged view, partly in horizontal section, of the slack adjuster shown in Fig. 1, the ratchet bar being in its innermost position; Fig. 3 is a like view illustrating the ratchet bar projected slightly and the adjusting pawl and locking pawl locked in their inoperative positions relative to the ratchet bar; Fig. 4 is a side elevational view of one side of the slack adjuster; and Figs. 5, 6, 7 and 8 are vertical cross sectional views taken on the lines 5—5, 6—6, 7—7 and 8—8 respectively of Fig. 2.

As shown in the accompanying drawing, the slack adjuster may comprise a bracket or casing 1, preferably having an end flange 2 which is rigidly secured to a car truck bolster 3 or any other desired cross member of the truck. Above the truck bolster and supported thereby, preferably through the medium of the usual body and truck center bearings (not shown), is a body bolster 4 which is part of the underframe of a car body, the clearance between the bolsters being that usually provided in car construction.

The bracket 1 may also comprise vertically spaced horizontally disposed top and bottom plates or walls 5, which for a portion of their length are connected together by a vertically disposed web 6 which extends outwardly from the flange 2 in a direction longitudinally of the truck. The walls 5 extend some distance beyond the outer end of the wall 6 and at their extreme outer ends are connected together by an end wall 7.

Arranged between the walls 5 is an adjusting ratchet bar 8 having grooves or ways 9 formed in its top and bottom surfaces into which inwardly extending guide lugs 10 formed on the walls 5 extend. The ratchet bar 8 is movable longitudinally relative to the casing, the lugs 10 permitting such movement and preventing movement in any other direction.

Adjacent the outer end of the ratchet bar 8, and extending outwardly from one side of the bar, is a projection 11, on which is pivotally mounted one end of a dead lever anchor member 12 comprising bars 13 and 14 which are disposed longitudinally of the bracket and are pivotally mounted on the projection 11 and are held against separation from the ratchet bar by a washer 15 and a cotter pin 16 which passes through the projection 11. The bar 13, at its extreme inner end, is adapted to engage an abutment 18 projecting outwardly from the side of the inner end of the ratchet bar. This abutment is provided with an outwardly projecting lip 19 which is adapted to overlap the bar 13 to prevent undue lateral movement thereof relative to the ratchet bar.

In the drawing, the clearance between the projection 11 and the anchor or fulcrumed member 12 has been shown much greater than would be provided in actual practice, but this has been done to illustrate clearly that the force exerted by the dead brake lever 21 in applying the brakes, cannot be transmitted to the lug 11.

The bar 14 is slightly shorter than the bar 13, and at its inner end is spaced away from the bar 13 by a stud 20, thus forming in effect a jaw for the reception of the upper end of a dead brake lever 21 which is operatively connected to the anchor member 12 by a pin 22 which passes through an opening in the lever and has its ends anchored to the bars 13 and 14.

The anchor member 12 is pivotally connected to the ratchet bar 8, so that, any movement of the bracket 1 and ratchet bar 8 in the direction of the length of the dead brake lever 21, caused by the usual vertical up and down movement of the bolster 3, will not be transmitted to the brake lever.

Extending longitudinally of the bracket for its full length, is a rod 23, the ends of which are mounted in the flange 2 and end wall 7, and upon this rod is slidably mounted a follower member 24 having a cylindrical body portion 25, a rear bearing portion 26, an end wall 27 and a front bearing portion 28 extending forwardly from the wall 27. Extending outwardly from the body portion is an annular flange 29, and interposed between this flange and the flange 3 of the bracket 1, is a spring 30 which exerts an outward pressure on the follower member.

Projecting upwardly from the flange 29 of the follower member is an arm 31, to the upper end of which is connected one end of a flexible member such as the chain 32, the other end of the chain being connected to the upper end of a live brake lever 33.

Extending forwardly from the end wall 27 of the follower member and connected with the forward bearing portion 28 is a horizontally disposed flange 34 having an upwardly extending lug or pivot 35 on which a ratchet pawl 36 is pivotally mounted, the inner end of the arm 54 of said pawl being adapted to operatively engage teeth 37 on one side of the ratchet bar 8. The outer arm 55 of the pawl is recessed to slidably engage the head 38 of a plunger 39, which head is preferably in the form of a portion of a sphere. The inner end of the pin 39 extends through the end wall 27 and is slidably guided therein. Between the head 38 of the pin and the end wall 27, there is interposed a spring 40, the pressure of which is adapted to yieldably maintain the pawl in engagement with the teeth 37 of the bar 8.

Adjacent the end wall 7 of the bracket, and pivotally mounted on a pin 41, mounted in the side walls 5, is a locking pawl 42 having a tooth 43 adapted to engage with the teeth 37 to lock the bar 8 against rearward movement. This pawl 42 has rearwardly extending lug 44 which has two functions, the first being to prevent the ratchet pawl from being accidentally moved out of engagement with the teeth of the ratchet bar, and the second being to maintain the pawl 36 out of engagement with the teeth 37 when it is desired to remove or replace the ratchet bar, all of which will be hereinafter more fully described.

The locking pawl 42 is also provided with a handle portion 45 which is adapted to be engaged by a plunger pin 46 which is preferably in axial alignment with the pin 39, and has its inner end loosely mounted in a lug 47 rising from the forward bearing portion 28 of the follower member. Interposed between the head 48 of the pin 39 and the lug 47 is a spring 49 which is adapted to urge the pin and thereby the handle portion 45 forward so as to maintain the tooth 43 in locking engagement with one of the teeth 37. The inner end of the plunger pin 39 is adapted to engage the outer arm 55 of the pawl 36 when it is desired to operate both pawls to their inoperative positions as shown in Fig. 3 of the drawings.

The brake levers 21 and 33 are adapted to be operatively connected to the usual brake beams which carry the usual brake heads and shoes, at the points 49 and 50 respectively.

In the drawings, the brake levers are shown disposed vertically and the slack adjusting mechanism positioned to suit, this being done to more clearly illustrate the invention, but I am aware that these levers are usually disposed at an angle and in such cases the slack adjusting mechanism would be disposed at an angle to that shown.

In operation, when the brakes are being applied, the upper end of the live lever 33 is pulled to the right until the brake shoes engage the car wheels 51 when the lever turns about the fulcrum point 50 which shifts a connecting rod 52 to the left, which rod, being connected to the lower end of the dead lever 21, causes the lever 21 to move to the left until the brake shoes controlled thereby engage the car wheels 53, at which time the lever 21 tends to turn about the pivot 49. Since the upper end of the lever 21 is fulcrumed to the brake lever anchor member 12, cooperating with the ratchet bar, the tendency of the upper end of the lever and the ratchet bar to move to the right is prevented by the engagement of the locking pawl 42 with the teeth 37 of the ratchet bar.

It will here be noted that when the brakes are applied or being applied, the force exerted by the upper end of the lever 21, which force is in a direction toward the right hand, is transmitted to the lug 18, on the inner end of the ratchet bar, through the medium of the pin 22 and anchor bar 13 of the anchor member so that none of this force comes upon the pivot lug 11 thus reducing wear of the pivot lug and anchor member and preventing undue resistance to the pivotal movement of the anchor member at the pivot point.

If the brake cylinder piston travel on the car does not exceed a predetermined amount in applying the brakes, the slack in the chain 32 is merely taken up and the movement of the upper end of the live lever 33 to the right, will not be sufficient to cause the chain 32 to pull and move the follower member 24.

If the brake cylinder piston travel on the car should exceed a predetermined amount, the chain 32 is pulled toward the right hand a sufficient distance as to cause the follower member 24 to be moved along the rod 23 toward the right hand, against the pressure of the spring 30, carrying with it the adjusting pawl 36. When the adjusting ratchet pawl is thus moved, the inner arm 54 thereof rides out of engagement with one of the teeth 37 of the ratchet bar, the pressure of the spring 40 acting on the outer arm 55 to maintain the inner arm in contact with the teeth. Should the ratchet pawl be moved a greater distance than the space between two adjacent teeth on the ratchet bar, the spring actuated plunger 39 acting on the outer arm 55 causes the inner arm 54 to engage the ratchet bar one tooth to the right of the tooth it had previously engaged. During this movement of the adjusting ratchet pawl, the ratchet bar is held against movement to the right by engagement of the locking pawl 42 with the teeth 37.

When the brakes are released, and the upper end of the live lever 33 returns to its normal position, the pressure of the spring 30 causes the follower member 24 and adjusting ratchet pawl 36 to move toward the left, and since the end of the inner arm 54 of this pawl is in engagement with one of the teeth 37, the ratchet bar will be caused to move toward the left a distance equal to the distance between two adjacent teeth, thus moving the fulcrum point of the upper end of the dead lever 21 the same distance toward the left. The locking pawl 42 does not interfere with this movement of the ratchet bar 8 toward the left hand, since the tooth 43 of this pawl rides out of engagement with the tooth 37 it had been previously engaged with, and is moved, by the action of the spring urged plunger 46, into engagement with the next tooth to the right. In this manner excess piston travel is taken up step by step and thus the piston travel is held within narrow limits.

When the adjusting ratchet pawl 36 is in its normal extended position, as shown in Fig. 2 of the drawings, the lug 44 of the locking pawl 42 overlaps and engages a portion of the inner arm 54 of the pawl 36, so that when a car to which the device is applied is subjected to heavy end shocks, the tendency of the ratchet bar 8 to move toward the left hand will be prevented due to the engagement of the arm 54 with the lug 44 on the pawl 42 before the arm 54 of the pawl 36 can be moved out of engagement with the ratchet bar. It will thus be seen that the pawl 36 must be moved toward the right hand before the inner arm 54 thereof can be moved out of engagement with a tooth of the ratchet bar.

When it is desired to reset the slack adjuster or to remove or replace the ratchet bar 8, the locking pawl, through the medium of the handle 45, is rotated anti-clockwise about the pin 41, against the pressure of the spring 40. The initial movement of the pawl causes the tooth 43 to be moved out of engagement with the ratchet bar and the lug 44 to be moved toward the ratchet bar out of overlapping relation with the arm 54 of the pawl 36. The continued movement of the locking pawl 42 causes the free end of the pin 46, which is loosely mounted in the lug 47, to engage the arm 55 of the pawl 36, causing this latter pawl to rotate in an anti-clockwise direction against the pressure of the spring pressed plunger 39, until such time as the end of the arm 54 of the pawl 36 is moved out of engagement with the ratchet bar and in a position beyond the lug 44 of the locking pawl, in a direction away from the ratchet bar. The lug 44 remains in engagement with the arm 54 of the ratchet pawl until this latter pawl is out of engagement with the bar 9, thus preventing the pressure of the spring 30 from moving the follower member, ratchet pawl and bar forward beyond their normal adjusted positions.

When the arm 54 of the pawl 36 is thus moved out of engagement with the ratchet bar, the spring 30, which is under an initial compression, will cause the follower 24 and the ratchet pawl 36 to move forward against the pressure of the springs 40 and 49 until the end of the arm 54 engages a curved surface 56 of the locking cam 42, which halts the forward movement of the follower and pawl 36. Now, if the pressure on the handle 45 of the locking pawl is relieved, the pressure of the spring urged plunger 46 causes the locking pawl to rotate about the pin 41 in a clockwise direction. This rotative movement causes the lug to engage one side of the end of the arm 54 as shown in Fig. 3 of the drawings.

The pressure of the spring 49 acting on the handle 45 of the locking pawl is greater than the pressure of the spring 40 acting on the arm 55 of the ratchet pawl 36 so that when the pawls are in the positions just described and shown in Fig. 3, the lug 44 will prevent the pawl 36 from operating toward the ratchet bar, and since the pressure of the spring 49 is greater than that of the spring 40, the arm 55 of the pawl 36 will be maintained in engagement with the end wall 27 of the follower 24 so that the rotating movement of the locking pawl 42 will be stopped before the tooth 43 thereof can be moved into the plane of the teeth of the ratchet bar. It will thus be seen that the adjusting ratchet pawl 36 and the locking pawl 42 are effectively locked out of engagement with the ratchet bar.

With the pawls 36 and 42 thus locked, the ratchet bar may be removed or replaced.

With the ratchet bar replaced, the pawls 36 and 32 will be automatically unlocked upon the effecting of an application of the brakes. When an application of the brakes is effected, the movement of the live brake lever 33 toward the right hand will, through the medium of the chain 32, cause the follower 24 and pawl 36 to be moved inwardly against the pressure of the spring 30, to their normal positions. At or just before the time the follower 24 reaches its normal position, the arm 36 will be moved beyond the end of the lug 44 and out of locking engagement therewith. At the time the arm 54 of the ratchet pawl is moved out of engagement with the lug 44 of the pawl 42, the pressure of the spring 40 causes the arm 54 to move into engagement with the ratchet bar and at the same time the pressure of the spring 49 causes the pawl 45 to rotate until the tooth 43 thereof engages the ratchet bar, when the lug 44 will again overlap the arm 54 to prevent accidental movement thereof as hereinbefore described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a plurality of brake levers, of an automatic slack adjuster comprising a movable bar, a member pivotally and slidably engaging said bar and having one of said brake levers fulcrumed thereto, and means for adjusting said bar to take up slack.

2. The combination with a plurality of brake levers, of an automatic slack adjuster comprising a movable bar, a member extending for substantially the full length of said bar and pivotally connected thereto, said member having one of said brake levers fulcrumed thereto, and means for adjusting said bar to take up slack.

3. The combination with a plurality of brake levers, of an automatic slack adjuster comprising a movable bar, a member pivotally connected at one end to one end of said bar and adjacent the other end of said bar being operatively connected with one of said levers, and means for adjusting said bar to take up slack.

4. The combination with a vehicle brake slack adjuster comprising a movable bar, of a projection on said bar adjacent its forward end, a member pivotally mounted on said projection, a brake lever fulcrumed to said member, and a projection on said bar adapted to be engaged by said member when said lever is operated to apply the brakes to prevent the forces exerted by said lever from being transmitted to the first mentioned projection.

5. The combination with a vehicle brake slack adjuster comprising a movable bar, of a projection on said bar adjacent its forward end, a member pivotally mounted on said projection, a brake lever fulcrumed to said member, and means whereby the force exerted by said lever in applying the brake is transmitted to said bar independently of said projection.

6. The combination with a vehicle brake slack adjuster comprising an adjustable member, of a fulcrum member pivotally connected to said adjustable member, a brake lever fulcrumed to said fulcrum member, and means for preventing the force exerted by said lever in applying the brakes from being transmitted through said fulcrum member to said adjustable member through the connection between said adjustable member and fulcrum member.

7. The combination with a vehicle brake slack adjuster comprising an automatically adjustable member, of a dead lever fulcrum member pivotally connected to said adjustable member, a dead lever having its upper end fulcrumed to said fulcrum member, and an abutment on said adjustable member with which said fulcrum member cooperates to transmit the forces exerted by said lever, in applying the brakes, to said adjustable member.

8. The combination with a vehicle brake slack adjuster comprising an adjustable member, of a fulcrum member pivotally connected adjacent its forward end to said adjustable member, a brake lever fulcrumed to said fulcrum member adjacent the rear end of the fulcrum member, and means on said adjustable member against which the rear end of said fulcrum member abuts.

9. The combination with a vehicle brake slack adjuster comprising an adjustable member, of a fulcrum member pivotally connected adjacent its forward end to said adjustable member, a brake lever fulcrumed to said fulcrum member adjacent the rear end of the fulcrum member, and a projection on said adjustable member adapted to be engaged by the rear end of said fulcrum member.

10. The combination with a vehicle brake slack adjuster comprising an adjustable member, of a fulcrum member pivotally connected adjacent its forward end to said adjustable member, a brake lever fulcrumed to said fulcrum member adjacent the rear end of the fulcrum member, a projection on said adjustable member adapted to be engaged by the rear end of said fulcrum member, and a lip on said projection overlapping the rear end portion of said fulcrum member.

11. The combination with a car truck bolster capable of limited vertical movement and an automatic slack adjuster mounted on said bolster and comprising an adjusting bar, of a brake lever, a member operatively connecting said adjusting bar and brake lever and adapted to permit vertical movement of said slack adjuster relative to said lever, and a projection on said bar adjacent its rear end adapted to slidably engage said member as said slack adjuster moves vertically.

12. The combination with a car truck bolster capable of limited vertical movement and an automatic slack adjuster mounted on said bolster and comprising an adjusting bar, of a brake lever, a member operatively connecting said adjusting bar and brake lever and adapted to permit vertical movement of said slack adjuster relative to said lever, and a projection on said bar located rearwardly of said lever adapted to be engaged by said member regardless of the movement of said slack adjuster relative to said lever.

13. The combination with a truck bolster capable of limited vertical movement, of an automatic slack adjuster comprising a bracket mounted on said bolster, a bar mounted in said bracket and adjustable to take up slack, said bracket and bar being movable vertically with said bolster, a member pivotally connected at one end to said bar and adapted to be slidably engaged at the other end by said bar, and a brake lever connected to said member intermediate the ends of the member.

14. The combination with a truck bolster capable of limited vertical movement, of an automatic slack adjuster comprising a bracket mounted on said bolster, a bar mounted in said bracket and adjustable to take up slack, said bracket and bar being movable vertically with said bolster, a member pivotally connected at one end to said bar and adapted to be slidably engaged at the other end by said bar, and a brake lever connected to said member intermediate the ends of the member, the connection between said lever and bar being adapted to permit movement of the bar relative to said lever in the direction of the length of the lever.

15. The combination with a truck bolster and a plurality of operatively connected brake levers, of an automatic slack adjuster comprising a bracket mounted on said bolster, a ratchet bar mounted in said bracket and operatively connected with one of said levers, a pawl movable in a direction longitudinally of said casing for adjusting said bar, and a pawl carried by said casing adapted to lock said bar in its adjusted position and to lock the first mentioned pawl against accidental separation from said bar when said bar is in adjusted position.

16. The combination with a truck bolster and a plurality of operatively connected brake levers, of an automatic slack adjuster comprising a bracket mounted on said bolster, a ratchet bar mounted in said bracket and operatively connected with one of said levers, a pawl operatively connected with another of said levers for adjusting said bar to take up slack, and a pawl mounted on said casing adapted to lock said bar in adjusted position and to maintain the first mentioned pawl in engagement with said bar when the bar is in adjusted position.

17. The combination with a truck bolster and a plurality of operatively connected brake levers, of an automatic slack adjuster comprising a bracket mounted on said bolster, a ratchet bar mounted in said bracket and operatively connected with one of said levers, a pawl operatively connected with another of said levers for adjusting said bar to take up slack, and a pawl mounted on said casing adapted to cooperate with said bar and second mentioned pawl for maintaining said bar in adjusted position.

18. The combination with a truck bolster and a plurality of operatively connected brake levers, of an automatic slack adjuster comprising a bracket mounted on said bolster, a ratchet bar mounted in said bracket and operatively connected with one of said levers, a pawl operatively connected with another of said levers for adjusting said bar to take up slack, and a pawl mounted on said casing adapted to lock said bar in adjusted position against rearward movement and adapted to cooperate with the first mentioned pawl to lock said bar against unintentional forward movement.

19. The combination with a truck bolster and a plurality of operatively connected levers, of an automatic slack adjuster comprising a bracket mounted on said bolster, a ratchet bar mounted in said bracket and operatively connected with one of said levers, a ratchet pawl operative upon the operation of the other of said brake levers for adjusting said bar, a locking pawl carried by said casing and adapted to lock said bar against rearward movement, and a lug on said locking pawl adapted to cooperate with said ratchet pawl to lock said bar against unintentional forward movement relative to the bracket.

20. A railway vehicle brake slack adjuster comprising a bracket adapted to be secured to a part of a vehicle, a ratchet bar mounted in said bracket, a ratchet pawl operative to adjust said bar to take up slack, a locking pawl adapted to lock said bar in its adjusted position against movement in one direction and adapted to cooperate with said ratchet pawl to lock said bar in its adjusted position against unintentional movement in the opposite direction.

21. The combination with a car part and a plurality of operatively connected brake levers, of an automatic slack adjuster comprising a bracket mounted on said car part, a toothed member mounted in said bracket and operatively connected with one of said levers, a ratchet pawl adapted to engage the teeth of said member and operative to move said member forward to take up slack, a locking pawl carried by said bracket adapted to hold said member in its adjusted position against rearward movement, and means on said locking pawl adapted to maintain said ratchet pawl in engagement with said member to lock said member in its adjusted position against unintentional forward movement.

22. The combination with a plurality of brake levers, of an automatic slack adjuster comprising a bar operatively connected with one of said levers and movable forward in the direction of its length to take up slack, ratchet means controlled by the operation of another of said levers for moving said bar forward, and a locking pawl cooperating with said bar and ratchet means for holding said bar in adjusted position.

23. The combination with a plurality of brake levers, of an automatic slack adjuster comprising a bracket secured to a part of a vehicle, a bar operatively connected with one of said levers and movable forward in the direction of its length to take up slack, ratchet means controlled by the operation of another of said levers for moving said bar forward, and a pawl for locking said bar in adjusted position and adapted to be engaged by said ratchet means to limit the forward movement of said bar.

24. The combination with a plurality of brake levers, of an automatic slack adjuster comprising a bracket secured to a part of a vehicle, a bar operatively connected with one of said levers and movable forward in the direction of its length to take up slack, a ratchet pawl controlled by the operation of another of said levers for moving said bar forward, and a locking pawl engaging said bar and ratchet pawl for locking said bar in adjusted position, said pawls being operative to positions out of locking engagement with said bar and to locking engagement with each other and being operative out of locking engagement with each other upon effecting an application of the brakes.

25. The combination with a plurality of brake levers, of an automatic slack adjuster comprising a bracket secured to a part of a vehicle, a bar operatively connected with one of said levers and movable forward in the direction of its length to take up slack, a ratchet pawl controlled by the operation of another of said levers for moving said bar forward, and a locking pawl engaging said bar and ratchet pawl for locking said bar in adjusted position, said pawls being operative to positions out of locking engagement with said bar and to locking engagement with each other and being operative out of locking engagement with each other upon the operation of the last mentioned lever in effecting an application of the brakes.

26. The combination with a plurality of brake levers, of an automatic slack adjuster comprising a bracket secured to a part of a vehicle, a bar operatively connected with one of said levers and movable forward in the direction of its length to take up slack, a ratchet pawl controlled by the operation of another of said levers for moving said bar forward, and a locking pawl engaging said bar and ratchet pawl for locking said bar in adjusted position, said pawls being operative manually to positions out of locking engagement with said bar and operative automatically into engagement with each other to lock them out of locking engagement with said bar.

27. The combination with a plurality of brake levers, of an automatic slack adjuster comprising a bracket secured to a part of a vehicle, a bar operatively connected with one of said levers and movable forward in the direction of its length to take up slack, a ratchet pawl controlled by the operation of another of said levers for moving said bar forward, a locking pawl engaging said bar and ratchet pawl for locking said bar in adjusted position and operative manually to a position out of locking engagement with bar and ratchet pawl, and means operative by said locking pawl after said locking pawl is moved out of locking engagement with said ratchet pawl for moving said ratchet pawl out of engagement with said bar.

28. The combination with a plurality of brake levers, of an automatic slack adjuster comprising a bracket secured to a part of a vehicle, a bar operatively connected with one of said levers and movable forward in the direction of its length to take up slack, a ratchet pawl controlled by the operation of another of said levers for moving said bar forward, a locking pawl engaging said bar and ratchet pawl for locking said bar in adjusted position and operative manually to a position out of locking engagement with bar and ratchet pawl, means operative by said locking pawl after said locking pawl is moved out of locking engagement with said ratchet pawl for moving said ratchet pawl out of engagement with said bar, and means operative upon the release of manual pressure from said locking pawl for moving said locking pawl into locking engagement with said ratchet pawl for locking both said pawls out of engagement with said bar.

29. The combination with a plurality of brake levers, of an automatic slack adjuster comprising a bracket secured to a part of a vehicle, a bar operatively connected with one of said levers and movable forward in the direction of its length to take up slack, a ratchet pawl controlled by the operation of another of said levers for moving said bar forward, a locking pawl engaging said bar and ratchet pawl for locking said bar in adjusted position and operative manually to a position out of locking engagement with said bar and ratchet pawl, means operative by said locking pawl after said locking pawl is moved out of locking engagement with said ratchet pawl for moving said ratchet pawl out of engagement with said bar, means for advancing said ratchet pawl relative to said locking pawl when the pawls are moved out of engagement with each other, and means on said locking pawl adapted to engage said ratchet pawl when the manual pressure on said locking pawl is relieved, to lock both of said pawls out of locking engagement with said bar.

30. The combination with a plurality of operatively connected brake levers, of an automatic slack adjuster comprising a bracket, a bar operatively connected with one of said levers and movable to take up slack, a rod extending longitudinally of said bracket and having its ends mounted in said bracket, a follower member slidably mounted on said rod, a ratchet pawl mounted on said follower and engaging said bar, a connection from another of said levers to said follower member for moving said follower and ratchet pawl rearwardly relative to said bar when there is slack to be taken up, a locking pawl for holding said bar against rearward movement when said ratchet pawl is moved rearwardly, a spring interposed between said follower and bracket adapted to cause said follower and ratchet pawl to move forward to adjust said bar to take up slack, the forward movement of said follower ratchet pawl and bar being stopped by said ratchet pawl engaging said locking pawl.

In testimony whereof I have hereunto set my hand, this 17th day of December, 1928.

CLYDE C. FARMER.